C. E. DANIEL.
MOLDING MACHINE.
APPLICATION FILED MAR. 19, 1915.

1,261,493.

Patented Apr. 2, 1918.
5 SHEETS—SHEET 3.

WITNESSES:
R. L. Bruck
H. J. Small

INVENTOR,
Charles E. Daniel
BY Hull and Smith
ATTYS.

UNITED STATES PATENT OFFICE.

CHARLES E. DANIEL, OF SANDUSKY, OHIO.

MOLDING-MACHINE.

1,261,493. Specification of Letters Patent. Patented Apr. 2, 1918.

Application filed March 19, 1915. Serial No. 15,492.

*To all whom it may concern:*

Be it known that I, CHARLES E. DANIEL, a citizen of the United States, residing at Sandusky, in the county of Erie and State of Ohio, have invented a certain new and useful Improvement in Molding-Machines, of which the following is a full, clear, and exact description, reference being had to the accompanying drawings.

This invention relates to molds that are especially suitable for forming crayons of various kinds, such as wax crayons, blackboard chalks, and what are known as pastels; and while I do not limit the use of my invention to this particular field, because of its peculiar adaptability to the art of crayon making, I will herein describe it in such connection.

The invention further relates to apparatus wherein the molds above referred to are incorporated, and by means of which said molds may be operated in a manner to greatly facilitate the manufacture of crayons.

Some of the objects comprehended by my invention are the provision of a mold that is very convenient of use, and is extremely efficient in forming crayons having sides that are parallel longitudinally of the crayons, as in the case of cylindrical crayons, and which have one of their ends convergent, as, for instance, of a conical shape; the provision of a mold that is expansible, whereby the crayons may be easily released after having been formed; and the provision of an expansible mold that will produce crayons having smooth surfaces that are free from ridges or burs. Of the foregoing objects, I consider the one which provides a mold for producing crayons having tapered ends as the most important; for it is well known to those familiar with the art of crayon making, that heretofore no device has been evolved for making crayons with pointed ends, but that it has been the practice to sharpen the crayons, after they have been formed, and this has proved to be a difficult and expensive operation.

In the accompanying drawings I have shown molds wherein the above objects are attained; and my invention has for a further purpose, the provision of an apparatus or machine having incorporated within it molds of the aforesaid character in which the following sequence of operations may be conveniently carried out: first, the molds contracted; second, filled; third, expanded; and then the crayons ejected therefrom. A further object of the invention is the provision of mechanism for accomplishing the foregoing operations automatically.

I wish to mention the fact that I contemplate using my invention in the turning out of labeled crayons, in which instance the crayons are formed in the labels while the labels are confined within the molds. This feature will be explained at length hereinafter.

I have shown in the drawings two forms of apparatus embodying my invention, one a hand operated device, and the other a power driven machine, which operates automatically. After a brief description of the drawings, I will proceed to describe in detail and by the use of reference numerals, first, the automatic machine, and then the hand operated device.

In the drawings, Fig. 2 is a plan view of the machine shown in Fig. 1, Figs. 3 and 4 are transverse sectional views taken on the correspondingly numbered lines of Figs. 1 and 2, those parts which would appear beyond the plane of the section in Fig. 4, being omitted for the sake of clearness.

What may be considered the base of the machine illustrated in Figs. 1 to 9, is composed of a pair of side frames 1 and 2, that are connected together by tie rods 3, and are held at a fixed distance apart by tubular spacers 4 through which the tie rods pass. Rising from the respective frames 1 and 2, are side plates 1ª and 2ª, and the upper edges of the side plates are connected by a top plate 5.

Figure 7:
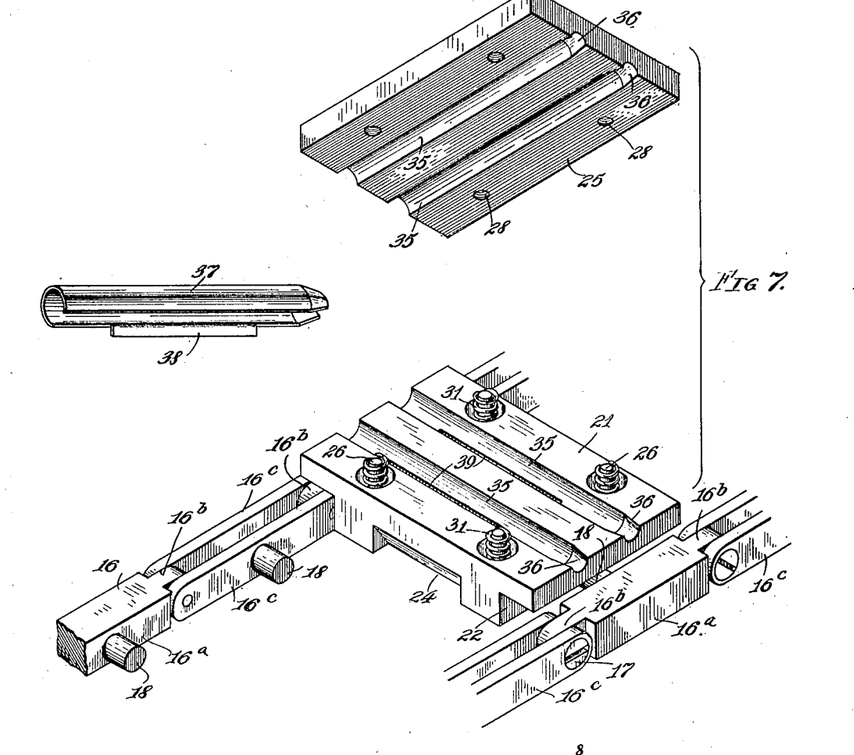
Fig. 7 is a perspective view of one of the molds, the parts whereof are separated, and including portions of the mold carrying chains.
Figure 8:
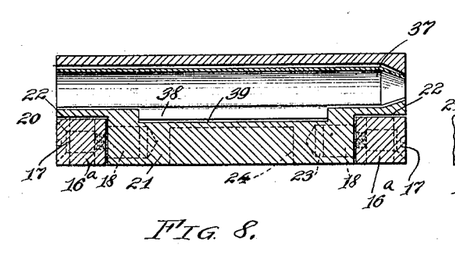
Fig. 8 is a transverse section through one of the molds and the aforesaid chains, the plane of the section being represented by the line 8—8 of Fig. 9.
Figure 9:
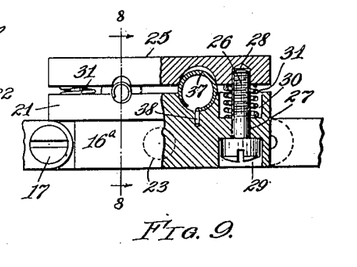
Fig. 9 is an end elevation of what is shown in Fig. 8, one half of the mold being broken away to the center line of one of the screws whereby the mold sections are connected.

Journaled within bearings that are formed, one half within the upper edges of the frames 1 and 2, and the other half within the bottom edges of the side plates 1ª and 2ª, are shafts 6, 7 and 8; and journaled within the extended ends of the side plates 1ª and 2ª, are shafts 9 and 10. Keyed, or otherwise secured to the shaft 9, adjacent each of the side plates 1ª and 2ª, is a sprocket wheel 11, and similar wheels 12 are mounted on shaft 10, in alinement with the former wheels. An endless chain 16 passes over the corresponding sprocket wheels of the shafts 9 and 10, and as shown in Fig. 7, each chain 16 is made up of solid and composite links which alternate throughout the length of the chain. In the aforesaid figure the solid links are represented at 16ª, and have ears 16ᵇ extending from their opposite ends; and to the sides of the ears 16ᵇ are pivoted the ends of the side plates 16ᶜ of the composite links. The pivotal connections between the links may be conveniently made by passing the smooth body portions of the screws 17 through the ears 16ᵇ and screwing the threaded, reduced ends of the screws into the inner one of the side plates 16ᶜ, while the tapered heads of the screws are permitted to move freely within a countersunk aperture in outer plate 16ᶜ. A trunnion 18 projects inward from the center of each of the links of the two chains, so that the trunnions of the opposed chains are in axial alinement.

The expansible molds already referred to in a general way, comprise each a pair of sections that are connected together in such manner as to permit of a limited extent of separation between the sections, and each of said sections is provided with one or more grooves or recesses which combine with those of the opposed section to form matrices or cavities that are of the shape of the crayon or object that the mold is intended to produce. The cavities thus formed may contain an expansible shell that is contracted when the mold sections are moved together, so that the interior of the shells define the exact size and shape of the finished object. In some uses of my invention, however, the expansible shells may be dispensed with, and a crayon label, which may or may not have been previously formed into a tube, may be placed in the molds before the sections are moved together, and then when the mold is compressed, such label will be closely confined within the molds, and the crayon material may then be forced into it. In this event, the crayons are complete when removed from the molds and are ready for packing.

The reference numeral 20 is applied, generally, to the molds, and what will be considered the base section of each mold is designated 21. This section has its underneath surface rabbeted at the ends to accommodate the chains 16, the cross sectional area of each rabbeted portion being substantially that of a chain 16, so that the exposed side and bottom of the chain are substantially flush with the adjacent surfaces of the base section. The vertical wall of each of the rabbeted portions is provided with a recess 23 for the reception of the trunnion 18 of the adjacent link of the chain. The lower portions of the sides of the section 21 are cut away on an incline, as shown at 24, for a purpose which will presently be explained. The top mold section 25 is connected to the section 21, by screws 26, which pass freely through holes 27 in the base section and are threaded into the tapped holes 28, of the top section. The bottom and top surfaces of the section 21, are recessed about the holes 27, as shown at 29 and 30, respectively. The heads of the screws 26 occupy the recesses in the bottom surface of the section 21, while springs 31 are contained within the recesses in the top surface thereof, and act to separate the mold sections.

The molds above described are each of a two crayon capacity, and are designed to produce cylindrical crayons having frusto conical ends. Therefore, each mold section is provided with a pair of semi-cylindrical grooves 35, the walls whereof converge at one end, as shown at 36. When the mold sections are together, the corresponding grooves of the two sections form a cavity or matrix of the exact shape of crayon that the mold is intended to produce; but in the embodiment herein illustrated, said cavity is of greater cross-sectional area than the finished crayon. The excess space of each cavity is taken up by an expansible shell 37, that is preferably formed of spring metal, and which is intended to occupy said cavity. As clearly illustrated in Figs. 7 and 9, the shell 37 consists of a split tube having a frusto conical end, and having a fin 38 extending outwardly from one of its edges. When the shell is within the cavity, the fin of the shell occupies a groove 39 in the bottom of a semi-cylindrical groove 35. In this manner, the shell is locked against longitudinal movement within the cavity. When the parts are assembled and the mold sections are forced together with the shell 37 compressed, the cross sectional area of the interior of the shell is substantially that of a finished crayon.

Figure 1:
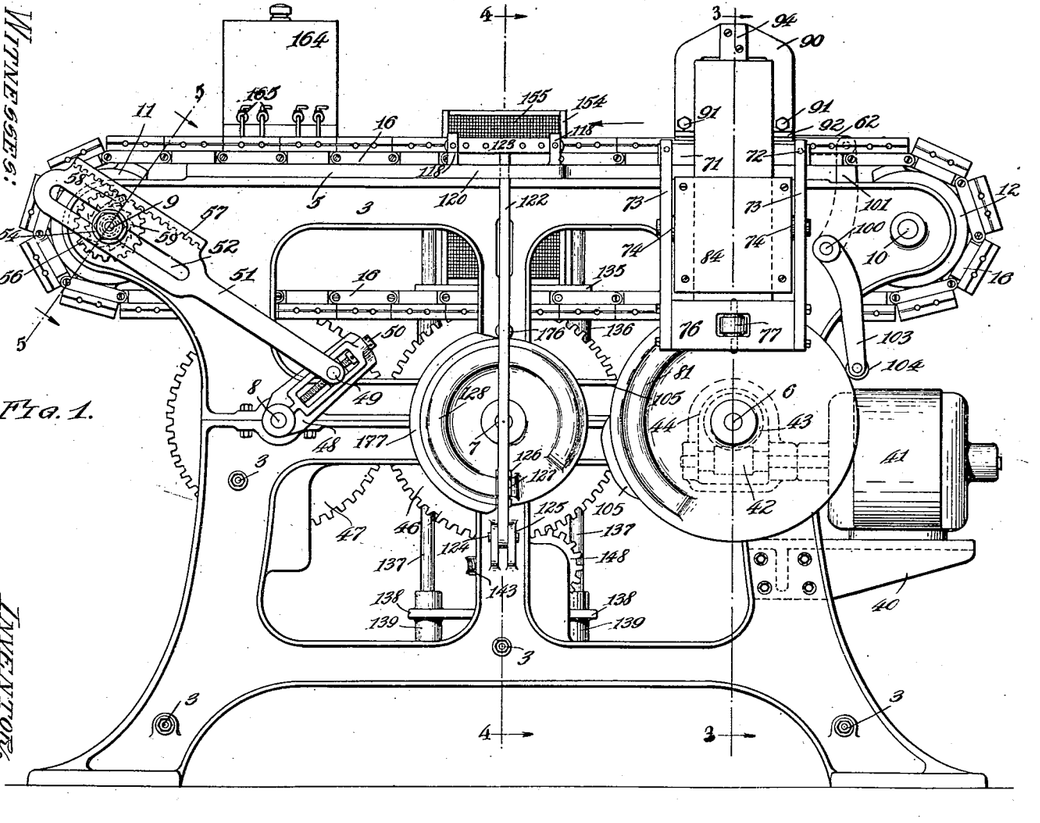
Figure 1 represents a side elevation of an automatic machine embodying my invention.

Mounted upon a bracket 40, that is supported by and between the right hand ends of the side frames 1 and 2 (viewed in Fig.

1) is a motor 41. A worm 42, secured to the motor shaft, meshes with a worm wheel 43, that is secured to the shaft 6, between the side frames of the machine, as clearly shown in Fig. 3. A casing 44 is shown in said figure as surrounding the worm and the worm wheel, and the lower portion of the casing provide a support for the outer end of the motor shaft. A spur gear 45 is keyed to the end of the shaft 6, where it projects beyond the side plate 2ª, and meshing with it, is a similar gear 46, that is screwed to the corresponding end of the shaft 7. This gear, in turn, meshes with a spur gear 47 that is fastened to the end of the shaft 8. To the opposite end of the shaft 8 is secured a crank 48, having a crank pin 49 that may be adjusted toward and from the shaft 8 by means of a screw 50. Pivoted to the crank pin 49 is one end of a link 51, the opposite end of which is provided with a slot 52, for the reception of the reduced end 53 of the shaft 9 (see Fig. 5). The link is thus permitted to reciprocate and oscillate upon the shaft 9, and is retained thereon by a washer 54 and a nut 55. Loosely mounted upon the shaft 9 adjacent the link 51, is a pinion 56 that meshes with a rack 57, which projects from one side of the link. A pawl 58 is pivoted to the side of the pinion 56, and is arranged to coöperate with the teeth of a ratchet wheel 59, that is keyed to the shaft 9, adjacent the gear 56.

From this description it will be seen that, as the crank 48 is rotated the link 51 will be reciprocated upon the shaft 9, to rotate the pinion 56 first in one direction and then the other, through the intervention of the rack 57. With the pawl 58 and ratchet 59 arranged as illustrated, the shaft 9 will be rotated to the left (as viewed in Fig. 1) as a link 51 is moved in the same direction.

And it is evident from the adjustability of the crank pin 49 that the extent of rotation imparted to the shaft 9 may be varied by the adjustment of the crank pin. Since the sprocket wheels 11 are fastened to the shaft 9, the rotation of said shaft will cause the chains 16 to be moved along the top plate 5, in the direction indicated by the arrow in Fig. 1.

60 represents a supply cylinder wherein the material from which the crayons are made, is stored under pressure, and in as much as this feature is common to crayon making machines, I will not describe it further than to say that the material is forced toward the exit end of the cylinder by means of a piston and in my machine the material is directed to the molds through a series of nozzles 61. The bores of the nozzles 61 are intersected by a slide or gate 62, having apertures 63 that are moved into register with the bores of the nozzles, when said gate is moved in one direction.

The nozzles 61 are situated within a zone that will be referred to hereinafter as the filling station. The intermittent movement of the chains which carry the molds is regulated so that two molds will be delivered to the filling station with their matrices in register with the bores of the nozzles, and rest there until the filling operation is completed. The filling operation consists in compressing the molds, or in other words, pressing their top sections down against their base sections to contract their shells 37. The gate 62 is then opened to permit the soft crayon material, which is of about the consistency of soft clay, to flow into the molds under the influence of the pressure within the cylinder 60. The mechanism for operating the gate is arranged so that a little more material than is required to fill the mold, is permitted to flow before the gate is closed. Therefore, when the gate is closed, a small quantity of material projects beyond the tapered end of each of the molds, and this material is next cut off, to leave a straight or finished end to the crayon. After this, the mold sections are permitted to separate to free the shells 37 from the crayon. The mechanism for performing the foregoing operations will now be described.

During the filling operation it is essential that the ends of the molds adjacent the nozzle 61, be in firm contact with said nozzles, so that no leak may occur at the joint between the nozzles and the molds. This is accomplished by providing a pressure plate 70 that is guided within a horizontal groove in a block 71, which rises from the top plate 5, and extends lengthwise a distance somewhat greater than the width of two molds. A pin 72 extends laterally from each end of the plate 70, through the block 71, and these pins are adapted to be engaged by the upper ends of arms 73, that are pivoted at 74, to the sides of vertical rails 75, which extend from the side plate 3. The lower ends of the arms 73 are connected by a member 76 having an opening containing an anti-friction roller 77. The roller 77 traverses the face of a cam 80 that is keyed to the end of the shaft 60 where it extends beyond the side plate 1ª, and said cam is provided with an elevated portion 81 that coöperates with the roller 77 to rock the arms 73 and cause their upper ends to force the pressure plate 70 against the molds 20 and move said molds bodily toward the nozzles 61, in which condition they are held during the time that the elevated portion 81 of the cam is beneath the roller 77. It will be understood that the lateral movement of the molds is very slight, but if the molds were guided between permanent abutments on each side that would confine them sufficiently tight to prevent any leakage at the joint between the molds and nozzles, the friction would be too great to allow the molds to move freely. For this reason, the mechanism just described has been provided.

It will be understood, then, that before the filling operation is started, the molds are moved against the ends of the nozzles, and are held in such position during said operation. The next step is to lower the presser head 82 against the molds to compress their top sections against their base sections. The presser head 82 is carried by a vertically reciprocable slide 83, that is guided between the previously mentioned rails 75 and a plate 84, which plate extends across the slide from one of the rails to the other. An anti-friction roller 85 is journaled upon a pin 86 that extends from the side of the slide 83, near its bottom, and said roller occupies a groove in the inner face of the cam 80 (see Fig. 6). The effective part 88 of the groove 87 is of a lesser radius than the remainder of said groove, and when the cam 80 rotates, the outer wall of the portion 88 of the groove engages the roller 85, drawing the presser head 82 down against the top of the molds that are therebeneath and pressing the top sections of the molds firmly against the base sections, and holding them in such condition during the filling operation.

Figure 2:
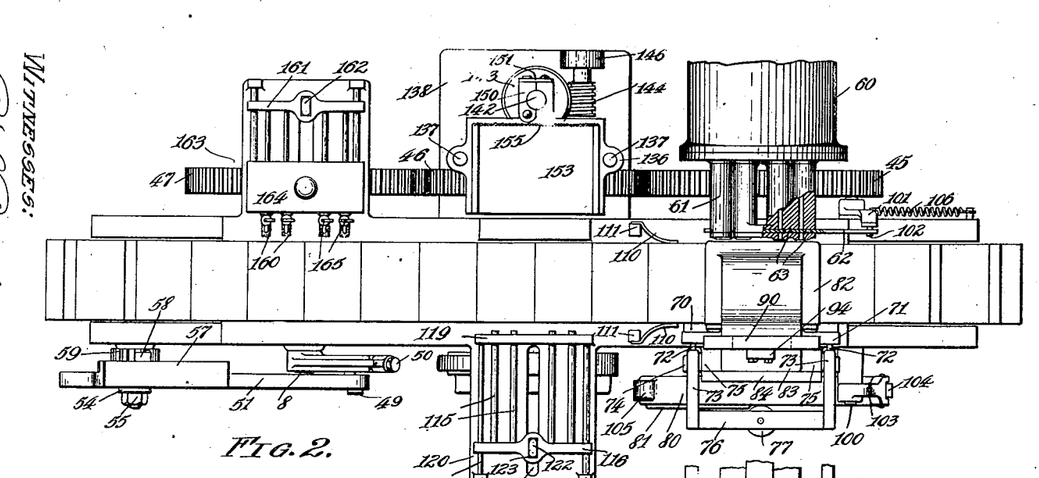
Figures 3, 4:
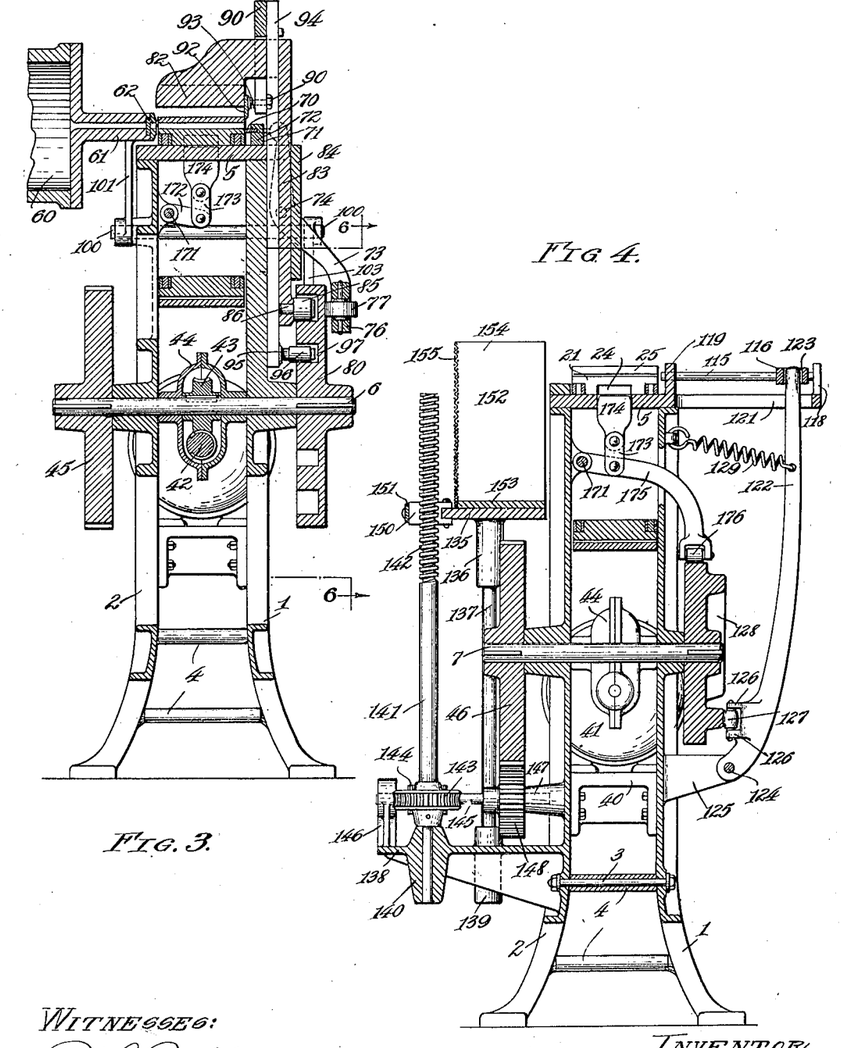
Figure 5:
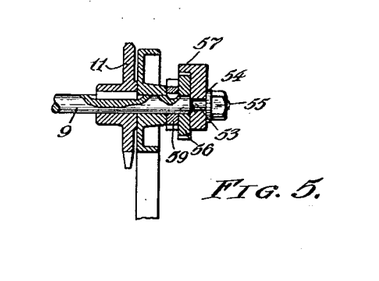
Fig. 5 is a sectional detail on line 5—5 of Fig. 1.
Figure 6:
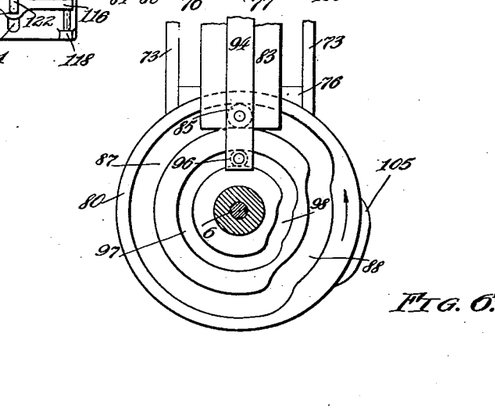
Fig. 6 is an inside face view of the cam for operating the mold compressing and filling mechanism, parts of said mechanism being included in said figure.

It will be noted from Fig. 2, that where the presser head is connected to the slide 83, it is reduced in width, as indicated by dotted lines, to form vertical guideways on each side of the head, adjacent the slide 83. A yoke 90 straddles the head and its vertical branches are guided within said guideways. Shanks of screws 91 are slidable within apertures in the lower ends of the branches of the yoke 90, and at their forward ends the screws 91 have connected to them a knife 92, that is yieldingly held against the rear face of the head 82, and against the ends of the molds 20, by springs 93, which surround the screws 91. A bar 94 has connection with the yoke 90, and passes downward through a groove that is formed in the face of the slide 83, the bar 94 extending some distance below the lower end of said slide. Herein, the bar is provided with a pin 95 on which is journaled an anti-friction roller 96 that traverses a groove 97, formed in the inner face of the cam 80. It will be noted from Fig. 6, that the effective portion 98 of the groove 97 is so arranged with respect to the effective portion 88 of the groove 87, that the knife 92 will be drawn downward after the presser head 82 has been moved in the same direction, and that it will be released or elevated prior to the elevation of said head. In the interval between the depression of the head 82 and the operation of the knife 92, the gate 62 is actuated to permit material to flow into molds. This is accomplished by the following mechanism.

100 represents a shaft that is journaled within the side plates 1ª and 2ª, and to the end of the shaft adjacent the cylinder 60, there is attached an arm 101, having a pin 102 at its upper end, which enters an opening in the end of gate 62. The opposite end of the shaft 100 has attached to it an arm 103, the lower end of which is bifurcated to receive a roller 104, that traverses the periphery of the cam 80. A raised portion 105 on the cam 80 coöperates with said roller to rock the arm 102, the shaft 100, and the arm 101, to slide the gate 62 in a direction to bring its openings 63 into register with the bores of the nozzle 61. As previously described, the gate is held open a sufficient length of time to allow the mold cavities or matrices to be filled slightly to overflowing so that a small quantity of the material protrudes from the reduced ends of the molds. Therefore, when the knife 92 operates, it will slice off the protruding ends of the crayons and leave the crayons in a finished condition. The angular extent of the cam 105 is such as will cause the above results. A spring 106 tends to move the arm 101 in a direction to close the gate 62, and to hold the roller 104 in contact with the periphery of the cam 80.

Upon the next movement of the sprocket wheels 11, the chains 16 will be moved a distance equal to the width of two molds. As the molds are moved from the filling station, their ends are scraped by a pair of spring plates 110, that are fastened to posts 111, which rise from the bed plate 5. By this means, any surplus material which may have been deposited on the ends of the molds, will be removed.

The molds are next delivered to the ejecting station, where the crayons are pushed out of the molds into a crate, or other suitable receiving device. While the receiving device might be a conveyer of some sort, because of the nature of the crayons which this particular machine is designed to produce, I prefer to employ crates for receiving the crayons and in which the crayons may be transported to ovens or kilns, where they may be dried or baked for packing. The ejecting mechanism comprises a series of rods 115, that are carried by a cross-head 116, the ends of which are guided upon stationary bars 117, that are supported at their rear ends, in posts 118 and at their forward ends, within the ends of a member 119. The rods 115 are guided through holes in the member 119, as clearly shown in Figs. 2 and 4. The posts 118 rise from an extension 120 of the top plate 5, said extension being slotted at 121. The upper end of an arm 122 reposes within an aperture 123 of the cross-head 116, said arm extending upward through the slot 121 in the extension 120. The lower end of the arm 122 is pivoted at 124, between ears 125, that extend from the side frame 1. The arm is provided with a pair of lugs 126, between which extends a pin whereon an anti-friction roller 127 is journaled for coöperation with a cam 128 that is keyed to the adjacent end of the shaft 7. A spring 129 tends to move the arm in a direction to shift the cross-head 116 toward the molds 20, thereby to project the rods 115 through the matrices of the molds 20, when permitted to do so by the passing of the elevated portion of the cam 128 from beneath the roller 127.

135 is a substantially rectangular pallet, having a depending boss 136 at each end, the bosses 136 being hollow for guidance upon a pair of posts 137 which rise from a shelf or bracket 138, that extends from the side frame 2. The shelf is provided with a pair of elongated bosses 139 wherein the lower ends of the posts 137 are securely fastened. The lower end of a shaft 141 is journaled within a third boss, 140, of the shelf 138, and said shaft has its upper end threaded at 142. Immediately above the boss 140, said shaft is provided with a worm wheel 143, for coöperation with a worm 144 (see Fig. 2) upon a shaft 145, that has one of its ends journaled within a bracket 146 that rises from the outer edge of the shelf 138, and its inner end journaled within a boss 147 that extends from the side frame 2. The shaft 145 has secured to it a pinion 148 that meshes with the gear 46. A pair of jaws 150 are pivoted to the edge of the pallet 155, and the adjacent faces of the jaws are provided each with a semi-cylindrical recess that is threaded for coöperation with the threads of the shaft 141, when said jaws are swung together to embrace said shaft. The jaws are held together by a latch 151, in which condition they constitute a split nut, and by means of which the pallet 135 is supported from the shaft. This connection also causes the pallet to be fed downwardly as the shaft is rotated in an appropriate direction.

152 represents a ventilated crate that is composed of a solid bottom 153, solid end walls 154, and a back 155 of a suitable wire screen; and the front of the box may be closed by a wire screen door that may be removably connected to the box, in some convenient manner. The crate may be placed upon the pallet 135, and said pallet elevated so that the bottom of the crate is just below the plane of the molds. The pallet 135 is intended to move downward slowly enough to permit one layer of crayons after another to be delivered to the crate and to distribute themselves thereacross, the crayons naturally adjusting themselves in horizontal layers because of their cylindrical formation.

In order to assure easy removal of the crayons from the molds, said molds are oiled prior to filling. An oiling station is located a distance from the ejecting station, corresponding to the distance between the ejecting station and the filling station. As will be seen from Fig. 2, the mold oilers comprise swabs or brushes 160, that are carried by a cross head 161, identical to the cross head 116 of the ejecting mechanism. In practically every respect, the oiling mechanism is like the ejecting mechanism, the upper end of the lever whereby the cross head 161 is reciprocated, being shown at 162. This lever is controlled by a cam 163 that is formed on the face of the gear 47. The swabs or brushes 160 are supplied with oil from a receptacle 164, that is supported above and by the member through which the stems of the swabs or brushes are guided. The flow of oil to the swabs or brushes is controlled by the faucets 165, there being one faucet for each swab or brush.

While it is intended that the parts of the mechanism shall be exact enough to cause the mold matrices to aline properly with the various devices or parts that coöperate with or enter them, nevertheless, to allow for possible stretching of the chains, or inaccuracies of parts, I prefer to employ means for positively centering or locating the molds properly within the various stations, and the mechanism for accomplishing this result will now be described.

Journaled within brackets which extend inwardly from the side plate 2ª, a slight distance below its upper edge, is a rock shaft 171, from which extend arms 172. Links 173 connect the free ends of the arms 172 to the lower ends of centering wedges 174, the body portions of which are slidable through slots in the top plate 5. The upper ends of the wedges are inclined in both directions, at angles corresponding to the inclination of the walls of the notches 24, that are formed in the sides of the base section 21 of the molds. I employ a wedge for the outer side of each of the two molds within each of the stations, such an arrangement requiring, therefore, six wedges. The wedges are elevated to force the molds together and in proper alinement with the parts wherewith they coöperate, by the oscillation of the shaft 171, and this is accomplished through the elevation of an arm 175, that is fastened to the shaft 171, and that has an anti-friction roller 176 carried by its outer or free end, and which traverses the periphery of the cam 128, said cam having an elevated portion 177 (Fig. 1).

Figure 10:
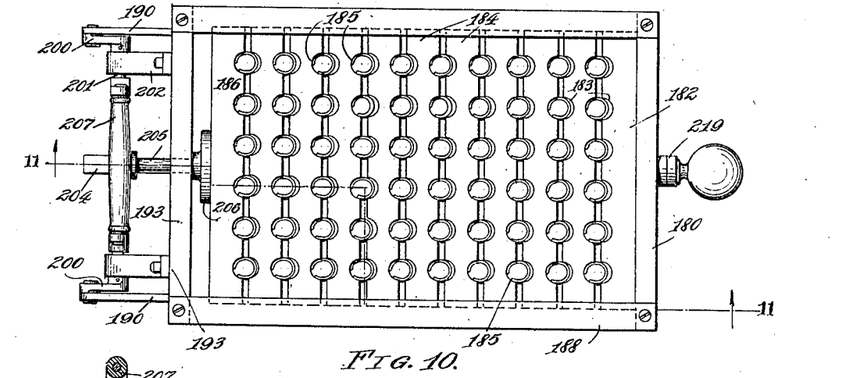
Fig. 10 is a plan view of a hand operated device embodying my invention.
Figure 11:
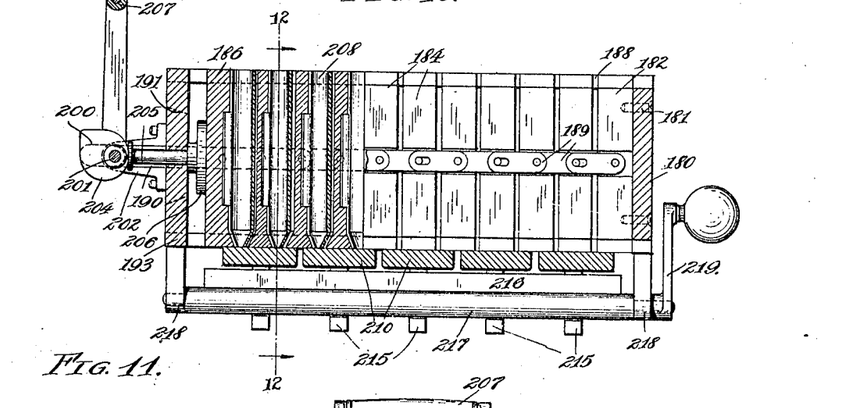
Fig. 11 is a sectional side elevation of the device shown in Fig. 10, the view being taken substantially on the line 11—11 of the former figure.
Figure 12:
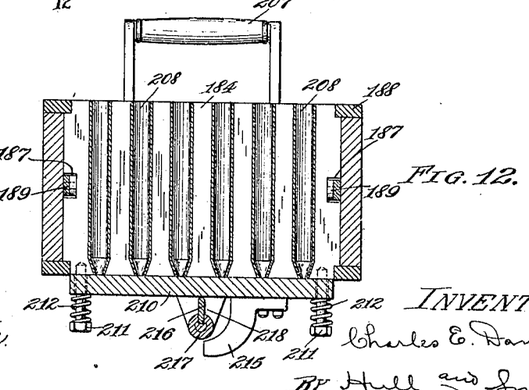
Fig. 12 is a transverse section on the line 12—12 of Fig. 11.

The hand operated device illustrated in Figs. 10 to 12, comprises a rectangular frame, to one of the end walls 180 of which is secured, by screws 181, a mold section 182. The face of the section 182, remote from the end wall 180, is provided with a plurality of semi-cylindrical grooves 183, having their lower ends tapered, and corresponding in every respect to the grooves 35 of the previously described molds 20. A series of mold sections 184, having their opposed faces provided with grooves 185, identical to and in alinement with the former grooves 183, extend from the mold section 182 toward the opposite end of the frame. A mold section 186, which is the reverse of the end section 182, forms the opposite end section of the series, and all of the sections have their side edges notched at 187, the notches of all of the sections being in alinement so that, when the sections are together, said notches produce, in effect, a channel.

Particularly from Fig. 12, it will be seen that the corners of the mold sections are rabbeted to receive strips 188 that extend along the upper and lower longitudinal edges of the frame. These strips serve to hold the mold sections within the frame in a manner to permit them to move toward and from each other.

The mold sections are connected together by links 189 that occupy the notches 187. Each link is provided with a pair of openings that receive pins which project from the vertical walls of the notches 187, and one or both of the openings are made large enough to permit a limited amount of separation between the mold sections. For instance, one of the openings may be a longitudinal slot, while the other may constitute a circular hole, as displayed in Fig. 11. A pair of links 190, longer than the links 189, extends from the opposite sides of the end mold section 186, through slots 191 in the end wall 193 of the frame, and are pivotally connected to the cranks 200 that are fastened to the rock shaft 201, supported in brackets 202, from the end wall 193. A cam 204 is secured to the shaft 201, at about its middle, and operates against the end of a plunger 205 which extends through the end wall and has a head 206 that bears against the end mold section 186. The shaft 201 is arranged to be rocked through substantially 180° by an operating handle 207 that is fastened to and extends from one side of the shaft.

It will be understood that shells 208, precisely like the shells 37 of my former modification, occupy the matrices of the mold sections 182, 184 and 186.

From the construction so far described, it will be seen that when the operating handle 207 is turned downward from the position in which it is shown in the drawings, the cam 204 will push the plunger 205 inward to move the mold sections together and compress the shells 208.

The lower ends of the matrices are closed by plates 210. It will be noticed that one plate extends across the adjacent sets of molds, and it will be explained that each plate is carried by the intermediate one of the three mold sections which contribute toward the formation of its three sets of matrices. Also, that the plates are yieldingly connected to said mold sections by having screws 211 pass freely through apertures in their ends and spring 212 confined between the heads of said screws and their adjacent surfaces. Each plate 210 is provided with a hook-shaped abutment member 215, the outer end of which is spaced from the middle portion of the plate, and in a position to be engaged by a fin 216 of a shaft 217 that is journaled in brackets 218, which extend from the end walls 180 and 193. The shaft is provided with a crank 219.

The hand operated device is intended particularly for use in the manufacture of black-board chalks, and the fresh material from which such chalks are made, is in the form of a thick liquid.

After the mold sections have been compressed, the operator pours the material on the tops of the molds and distributes it among the several matrices. He then sets the device aside to allow the chalks to harden or set. When the chalks have hardened sufficiently, the operator returns the operating handle 207 to its former position, thus oscillating the shaft 201 and, through the cranks 200, and the links 189 and 190, positively separates the mold sections to permit the shells 208 to expand and release the chalks. The nature of the material may cause the chalks to stick to the shells; and if this be the case, the operator may turn the crank 219 to cause the fin 216 of the shaft 217 to engage the abutments 215 and raise the plates 210. As the fin 216 moves beyond the ends of the abutments, the springs 212 will thrust the plates against the ends of the molds and loosen any crayons that may have stuck with the shells.

Having thus described my invention, what I claim is:—

1. A mold of the character set forth comprising a pair of sections having each a plurality of semi-cylindrical grooves, each groove having a converging end, said sections being arranged to fit together so that the grooves of the two sections combine to form cylindrical cavities having frusto-conical ends, one of the walls of each cavity having a channel, an expansible tubular receiving shell for the material to be molded, that is adapted to be confined within each of the aforesaid cavities, each shell having a fin that is received by the channel of the cavity which said shell occupies, one of said members having a plurality of holes and the other a plurality of alining threaded apertures, screws passing freely through the aforesaid holes and threaded into the aforesaid apertures, and springs surrounding said screws and interposed between the sections.

2. A mold of the character set forth comprising a pair of sections having each a groove, said sections being arranged to fit together so that the grooves of the two sections combine to form a mold cavity, one of the walls of said cavity having a channel, and an expansible shell that is adapted to be confined within said cavity and having a fin that is received by the aforesaid channel.

3. A mold of the character set forth comprising a pair of sections having each a groove, said sections being arranged to fit together so that the grooves of the two sections combine to form a mold cavity, and an expansible shell that is adapted to be confined within said cavity, the shell and one of said sections having interengaging parts whereby the shell is held against endwise withdrawal from the cavity.

4. A mold of the character set forth comprising a pair of sections that are movable toward and from each other, each section having a recess which combines with the recess of the other section to form a mold cavity when said sections are together, an expansible hollow receiving member for the material to be molded that is adapted to be confined within the mold cavity, said member and one of said sections having interengaging parts whereby the member is held against endwise withdrawal from the cavity, the mold being designed for subjection to means for moving the mold sections together, and means tending normally to separate the mold sections.

In testimony whereof, I hereunto affix my signature in the presence of two witnesses.

CHARLES E. DANIEL.

Witnesses:
BRENNAN B. WEST,
HUGH B. McGILL.

Copies of this patent may be obtained for five cents each, by addressing the "Commissioner of Patents, Washington, D. C."